United States Patent
Mulder

(10) Patent No.: US 9,033,138 B2
(45) Date of Patent: May 19, 2015

(54) ROD BELT FOR A ROD BELT CONVEYOR FOR AGRICULTURAL MACHINERY

(71) Applicant: Arnold Jäger Holding GmbH, Hannover (DE)

(72) Inventor: Jan-Harm Mulder, Dalen (NL)

(73) Assignee: Arnold Jäger Holding GmbH, Hannover (DE)

( * ) Notice: Subject to any disclaimer, the term of this patent is extended or adjusted under 35 U.S.C. 154(b) by 0 days.

(21) Appl. No.: 13/916,224

(22) Filed: Jun. 12, 2013

(65) Prior Publication Data

US 2014/0367229 A1     Dec. 18, 2014

(51) Int. Cl.
    *B65G 15/52*       (2006.01)
    *B65G 15/48*       (2006.01)
    *A01D 17/10*      (2006.01)
    *B65G 15/34*       (2006.01)

(52) U.S. Cl.
CPC ............. *B65G 15/48* (2013.01); *B65G 15/34* (2013.01); *A01D 17/10* (2013.01); *B65G 15/52* (2013.01); *A01D 2017/103* (2013.01)

(58) Field of Classification Search
CPC ............................. B65G 15/52; B65G 17/063
USPC ................................................. 198/848, 849
See application file for complete search history.

(56) References Cited

U.S. PATENT DOCUMENTS

| | | | |
|---|---|---|---|
| 2,906,395 A | 9/1959 | Greer | 198/850 |
| 3,976,192 A | 8/1976 | Muller | 198/835 |
| 3,985,224 A | 10/1976 | Harvey | 198/851 |
| 4,023,671 A | 5/1977 | Kramer | 198/728 |
| 4,653,632 A * | 3/1987 | Timmer et al. | 198/867.14 |
| 4,724,909 A | 2/1988 | Link | 171/126 |
| 5,099,548 A * | 3/1992 | Loosli | 24/38 |
| 5,168,981 A * | 12/1992 | Ruff | 198/850 |
| 5,176,248 A * | 1/1993 | Allen et al. | 198/850 |
| 5,671,839 A | 9/1997 | Sanderson | 198/848 |
| 5,692,598 A | 12/1997 | Röhrs | |

(Continued)

FOREIGN PATENT DOCUMENTS

| | | |
|---|---|---|
| DE | 0861071 | 12/1952 |
| DE | 2715108 | 12/1978 |

(Continued)

OTHER PUBLICATIONS

U.S. Appl. No. 13/916,277, filed Jun. 2013, Jäger et al.

(Continued)

*Primary Examiner* — Mark A Deuble
(74) *Attorney, Agent, or Firm* — Shlesinger, Arkwright & Garvey LLP

(57) ABSTRACT

Rod belt for rod belt conveyors for agricultural machinery includes rods arranged transversely with respect to the running direction and parallel to one another. At least one of the rods has flattened and perforated end areas with which it rests on tensile stress-resistant, elastic, continuous belts which revolve in parallel to one another, and is connected by rivets or similar fastening elements which pass through the end areas and the belts. The rod belt may be produced with a rod division that differs from, and in particular is smaller than, the division of the fastening points on the belts. This is achieved by providing that at least one additional rod is fixedly connected to the at least one rod which is connected to the belts, and the at least one additional rod is free of contact with the belts.

3 Claims, 3 Drawing Sheets

(56) References Cited

U.S. PATENT DOCUMENTS

| | | | |
|---|---|---|---|
| 5,738,223 A * | 4/1998 | Rohrs | 209/307 |
| 6,106,391 A | 8/2000 | Tjabringa | 460/144 |
| 6,896,125 B2 | 5/2005 | Webster et al. | 198/844.2 |
| 7,182,202 B2 * | 2/2007 | Kalverkamp | 198/844.1 |
| 7,308,786 B2 | 12/2007 | Mulder | 56/16.4 R |
| 2005/0109000 A1 | 5/2005 | Mulder | |
| 2008/0202405 A1 | 8/2008 | Kern | |

FOREIGN PATENT DOCUMENTS

| | | | |
|---|---|---|---|
| DE | 34 41 605 A1 | 5/1986 | |
| DE | 3737066 | 8/1989 | |
| DE | 37337 2 C2 * | 7/1992 | B65G 15/52 |
| DE | 195 20 925 A1 | 12/1996 | |
| DE | 195 20 927 A1 | 12/1996 | |
| DE | 200 11 436 U1 | 11/2000 | |
| DE | 10308823 | 9/2004 | |
| DE | 202007015687 | 2/2008 | |
| DE | 10 2007 049 839 | 6/2009 | |
| EP | 0080238 | 6/1983 | |
| WO | 9523497 | 8/1995 | |

OTHER PUBLICATIONS

EPO Office Action, dated Oct. 27, 2014, in counterpart European Application No. 14 17 1472 filed Jun. 6, 2014, which claimed the priority of U.S. Appl. No. 13/916,277, filed Jun. 12, 2013 (7 pages).

EPO Office Action, dated Nov. 7, 2014 in counterpart European Application No. 14 17 1465, filed Jun. 6, 2014, which claims the priority of U.S. Appl. No. 13/916,224, filed Jun. 12, 2013.

* cited by examiner

ROD BELT FOR A ROD BELT CONVEYOR FOR AGRICULTURAL MACHINERY

FIELD OF THE INVENTION

The present invention relates to a rod belt for rod belt conveyors for agricultural machinery.

BACKGROUND OF THE INVENTION

This type of rod belt is known from DE 195 20 925 A1. A disadvantage of this known rod belt is that numerous connecting points must be provided between the rods and the belts, in particular for a small rod division.

This disadvantage also exists in rod belts whose belts are provided on the bottom side with cams for a positive drive. The belts run with their cams over deflection wheels and drive wheels which are provided with a means which engages with the spaces between the cams, i.e., which has the same division as the cams and provides a positive drive or positive guide for the rod belts. This type of rod belt is known from DE 10 2007 049 839 B3, for example. In such rod belts, the division of the rods corresponds to the division of the cams, since the fastening points of the rods are located in the gaps between the cams. This is disadvantageous when a rod belt having a certain rod division must be exchanged for another belt having a different rod division. It is then necessary to replace not only the belts, but also the corresponding deflection wheels and drive wheels.

To eliminate this disadvantage, it has been proposed in DE 34 41 605 A1 not to guide the cams over the entire width of the belts, but, rather, to provide border zones which are free of cams. It is thus possible to fix the rods on the belts regardless of the division of the cams. As a result of this approach, rod belts may be produced in which the rod division differs from, and in particular may be smaller than, the division of the cams.

OBJECTS AND SUMMARY OF THE INVENTION

The object of the present invention is to provide a rod belt of the generic kind for rod belt conveyors, which may be produced with a rod division that differs from, and in particular is smaller than, the division of the fastening points on the belts.

This object is achieved according to the invention with a rod belt for rod belt conveyors for agricultural machinery, having rods arranged transversely with respect to the running direction and parallel to one another, wherein at least one of the rods has flattened and perforated end areas with which it rests on tensile stress-resistant, elastic, continuous belts which revolve in parallel to one another, and is connected by rivets or similar fastening means which pass through the end areas and the belts, wherein at least one additional rod is fixedly connected to the at least one rod which is connected to the belts, and the at least one additional rod is free of contact with the belts.

As a result of the approach according to the invention, the rod division may be reduced, for example with the division of the fastening points of the rods on the belts remaining the same. The rods which are not connected to the belts are brought at their ends close to the inner sides of the belt in order to optimally utilize the greatest possible usable width of the rods. To achieve a favorable load on the belts, it is meaningful for the longitudinal axes of the rods to lie approximately in the neutral fiber of the belts. For this purpose, according to the invention it is necessary only to appropriately downwardly bend the rods connected to the belts. The rods not connected to the belts may then be straight over their entire length, since they automatically lie in the neutral fiber of the belts due to the connection to the bent-down area of the rod connected to the belts.

Further advantageous embodiments of the invention result from the subclaims.

The invention is explained in greater detail below with reference to embodiments. The associated drawings show the following:

DETAILED DESCRIPTION OF THE INVENTION

Figure 1:
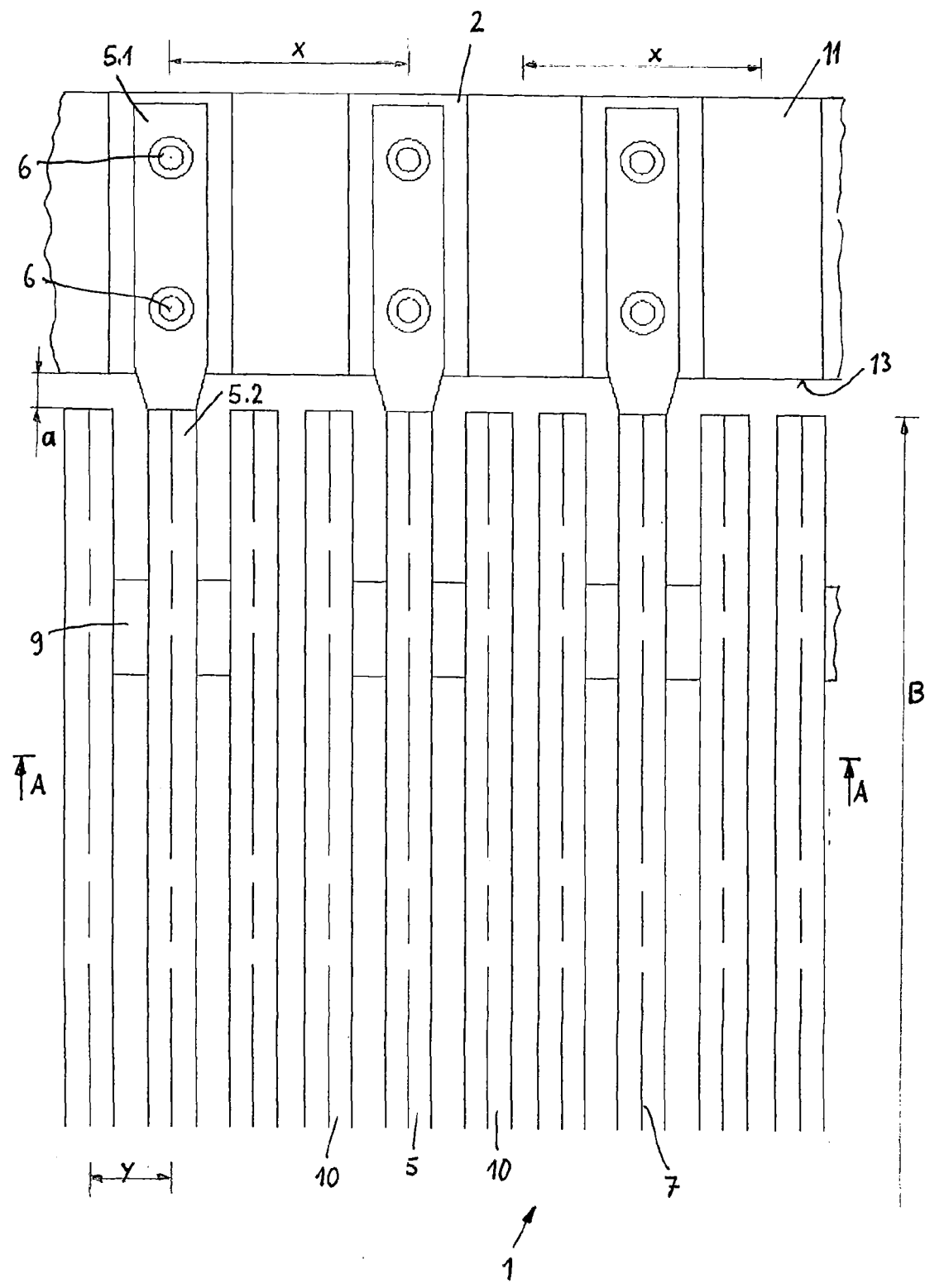
FIG. 1 shows a top view of a rod belt according to a first embodiment of the invention.

The rod belt 1 illustrated in the drawings is composed of two parallel revolving belts 2. Only one side of the rod belt 1 is illustrated in the drawings. The other side has a mirror-image design, so that the following statements also apply to this side.

Figure 2:
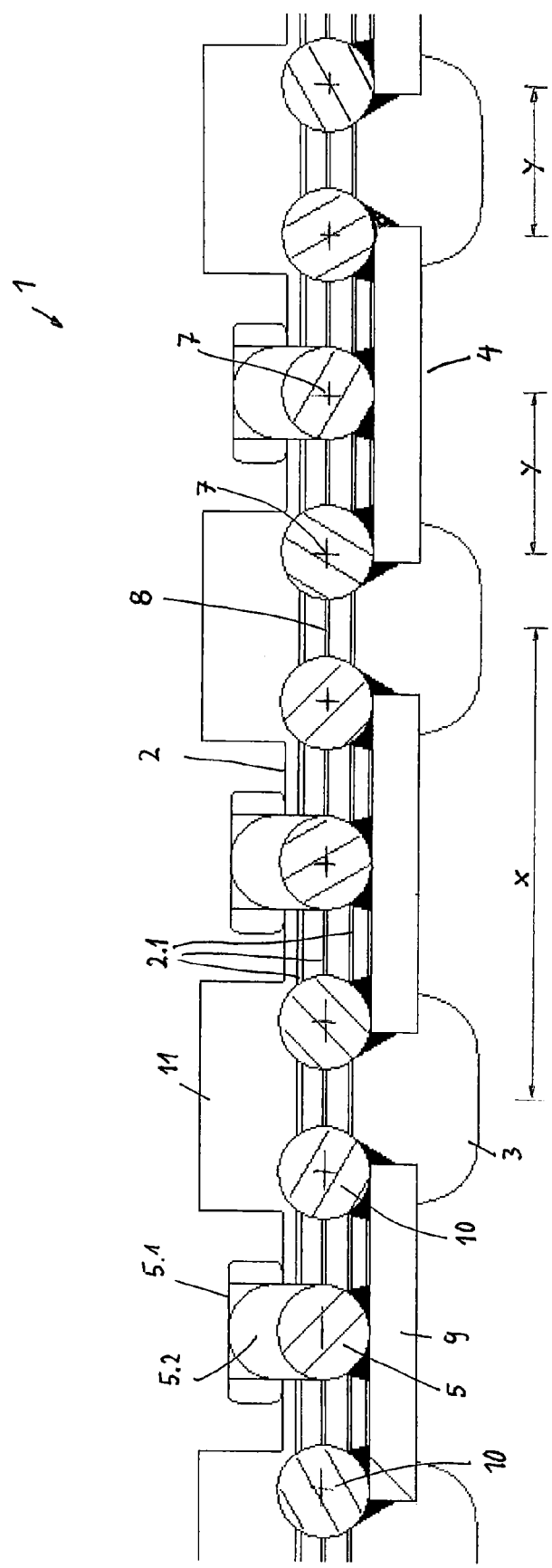
FIG. 2 shows a section A-A according to FIG. 1 in an enlarged illustration.

The belts 2 in the present embodiment are designed as cam belts, and may be made, for example, of rubber reinforced by fabric inserts 2.1 (see FIG. 2).

Cams 3 which are spaced apart from one another in a division x are provided on the bottom side of the belts 2. These cams 3 are used for the positive drive of the rod belt 1. For this purpose, a drive means, not illustrated, of drive wheels engages with gaps 4 present between the cams 3. These types of designs are known from the prior art, and therefore do not have to be explained in greater detail.

The spacing between the belts 2 is provided by rods 5 arranged transversely with respect to the conveying direction of the rod belt 1 and parallel to one another, and with their ends connected to the belts 2. For this purpose, the rods 5 are provided with flattened end areas 5.1 which are produced by forging from round bars, and which rest on the belts 2. The end areas 5.1 have two mutually spaced holes for fastening means, such as rivets 6, which pass through the flat end areas 5.1 as well as the belts 2.

The rods 5 lie on the belts 2 in the area above the gaps 4, between the cams 3, and therefore have the same division x as the cams 3. At their inner end, the end areas 5.1 of the rods 5 merge into a downwardly bent area 5.2, so that the longitudinal axes 7 of the rods 5 lie essentially in the neutral fiber 8 of the belts 2 (FIG. 2).

Crossbars 9 in the form of sheet steel strips are welded to the bottom side of the rods 5, and in each case two additional rods 10, which are situated parallel to the rods 5 and whose longitudinal axes 7 are situated in a division y from the longitudinal axes 7 of the rods 5, are welded to the crossbars at their top side. The rods 10 have the same diameter as the rods 5, so that their longitudinal axes 7 are likewise situated in the neutral fiber 8 of the belts 2. The adjacent rods 10 of two adjoining crossbars 9 are likewise spaced apart from one another in a division y. Thus, all rods 5 and 10 are arranged with respect to one another with the same division y, which is several times smaller than the division x of the cams 3.

The rods 10 have no contact with the belts 2, but are led at their ends tightly against the inner side 13 of the belts 2 in order to have the greatest possible usable width B (FIG. 1). In contrast to the rods 5, the rods 10 require no forging, but instead may be cut exactly to length from a coil, i.e., may be easily produced.

Since the fastening areas 5.1 of the rods 5, viewed in the running direction of the belts 2, have only a narrow extension, further cams 11 may be provided on the top side of the belts 2, diametrically opposite from the cams 3. These cams 11 are used for protecting the end areas 5.1 of the rods 5 which are fastened to the belts 2.

Figure 3:
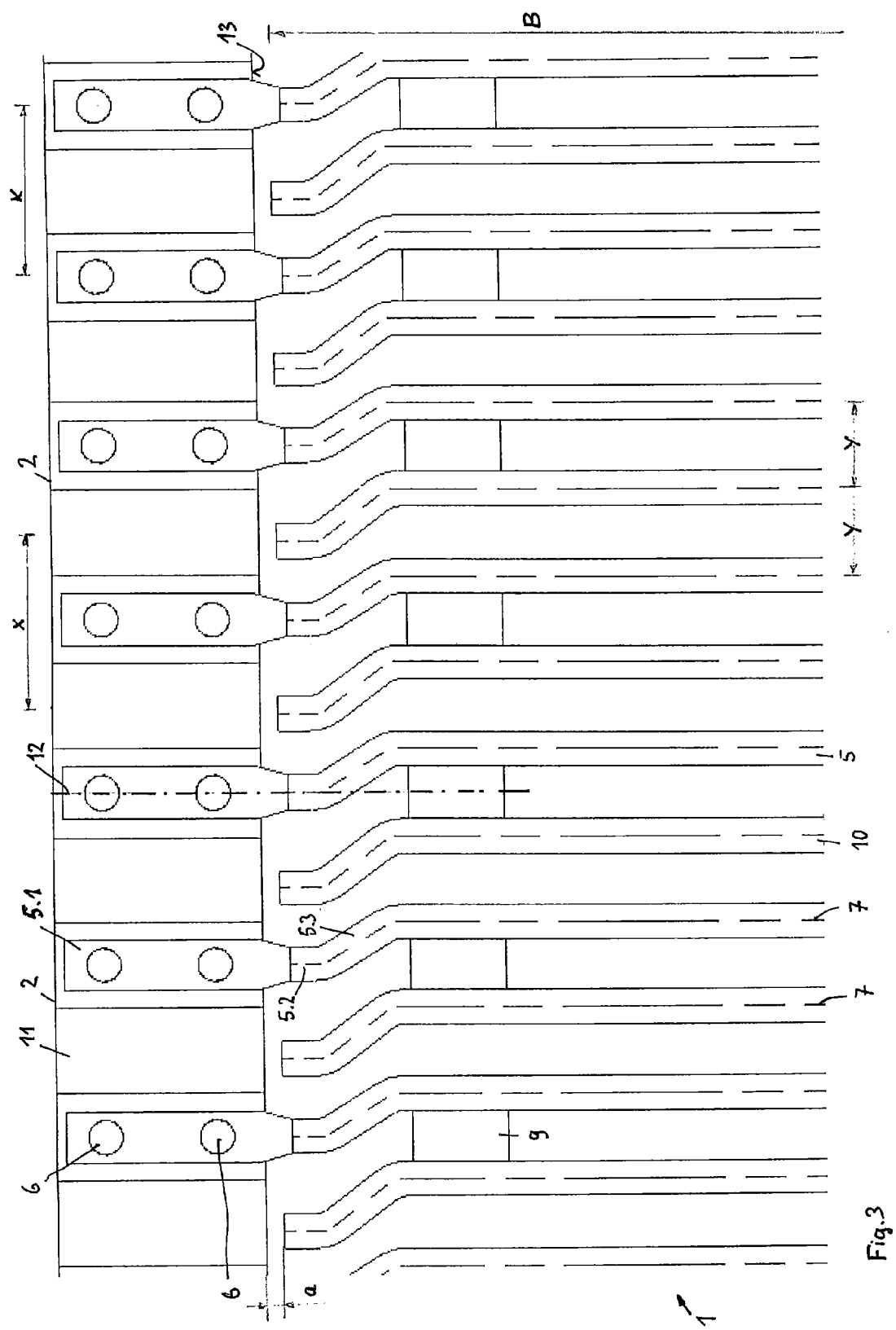
FIG. 3 shows a top view of a rod belt according to a second embodiment of the invention.

FIG. 3 shows another embodiment of the present invention. Identical or functionality equivalent components are provided with the same reference characters as in the preceding embodiment.

The embodiment according to FIG. 3 differs from the preceding embodiment solely in that only one additional rod 10 is welded to each crossbar 9. In addition to a downward bend 5.2 into the neutral fiber 8 of the belts 2, the rods 5 are provided with a further bend 5.3 in the direction opposite from the running direction of the rod belt 1. This further bend 5.3 is provided in order to achieve the most central progression possible of the fastening axis 12 of the end areas 5.1 between the rods 5 and 10. The intent is thus for the torques from the rods 5 and 10 acting on the fastening axis 12 to be compensated for to the greatest extent possible. The ends of the rods 10 are in turn brought close to the inner side 13 of the belts 2 (distance a), the end areas of the rods 10 likewise being provided with bends 5.2 and 5.3 in order to have the most parallel progression possible with respect to the end areas of the rods 5. In this embodiment as well, forging at the rods 10 is not necessary.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Rod belt for rod belts conveyors for agricultural machinery, the rod belt having a running direction and including a top side, a bottom side, an inner side, and a neutral fiber between the top and bottom sides, the rod belt comprising:
    a) rods arranged transversely with respect to the running direction and parallel to one another;
    b) at least one of the rods has flattened and perforated end areas with which it rests on tensile stress-resistant, elastic, continuous belts which revolve in parallel to one another, and is connected by rivets or fastening elements which pass through the end areas and the belts;
    c) at least one additional rod is fixedly connected to the at least one rod which is connected to the belts;
    d) the at least one additional rod is free of contact with the belts;
    e) a crossbar to which the at least one additional rod is fixedly connected is welded on both sides to the at least one rod which is connected to the belts; and
    f) the at least one additional rod which is free of contact with the belts is close to the inner side of the belt.

2. Rod belt according to claim 1, wherein:
    a) the at least one rod which is connected to the belts is bent toward the neutral fiber of the belts so that the longitudinal axes of the rods lie in the neutral fiber of the belts.

3. Rod belt according to claim 1, wherein:
    a) the at least one additional rod which is free of contact with the belts is straight over its entire length.

\* \* \* \* \*